United States Patent [19]

Ferrato

[11] 4,418,102
[45] Nov. 29, 1983

[54] LIQUID CRYSTAL DISPLAYS HAVING IMPROVED HERMETIC SEAL

[75] Inventor: Joseph P. Ferrato, Stow, Ohio

[73] Assignee: Eaton Corporation, Cleveland, Ohio

[21] Appl. No.: 263,791

[22] Filed: May 14, 1981

[51] Int. Cl.³ .............................................. G02F 1/13
[52] U.S. Cl. ......................................... 428/1; 350/343
[58] Field of Search ............................ 428/1; 350/343

[56] References Cited

U.S. PATENT DOCUMENTS

| | | | |
|---|---|---|---|
| 3,871,746 | 3/1975 | Muto et al. | 350/160 |
| 3,919,452 | 11/1975 | Ettre et al. | 428/325 |
| 3,926,502 | 12/1975 | Tanaka et al. | 350/160 |
| 3,990,781 | 11/1976 | Gum | 350/160 |
| 3,994,568 | 11/1976 | King et al. | 350/160 |
| 4,007,077 | 2/1977 | Yaguchi | 156/145 |

OTHER PUBLICATIONS

Shell Chemical Company Bulletin No. SC 21-79, dated Aug. 1979.

*Primary Examiner*—Marion McCamish
*Attorney, Agent, or Firm*—C. H. Grace; A. E. Chrow

[57] ABSTRACT

Disclosed are liquid crystal displays utilizing an electrically insulative hermetic seal for enclosing the liquid crystalline material between the plates of the display. The seal provides a durable improved barrier to the penetration of vapor into the display by being the crosslinked thermoset product of a composition comprising at least one phenoxy resin and at least one epoxy resin in conjunction with a sufficient amount of crosslinking agent to crosslink the composition sufficiently to provide the seal with improved resistance to vapor penetration.

13 Claims, 1 Drawing Figure

LIQUID CRYSTAL DISPLAYS HAVING IMPROVED HERMETIC SEAL

INTRODUCTION

This invention relates generally to liquid crystal displays utilizing a hermetic seal for enclosing the liquid crystalline material between a pair of plates of which at least one plate is transparent and more particularly to such liquid crystal displays utilizing an electrically insulative hermetic seal made from a crosslinked thermoset composition comprising at least one phenoxy resin and at least one epoxy resin in conjunction with an amount of crosslinking agent sufficient to insure that the composition is sufficiently converted to a thermoset sealant material to provide the seal with improved resistance to vapor penetration.

BACKGROUND OF THE INVENTION

Although various types of seals or gaskets have been widely used in the past to bond the edges of the plates of a liquid crystal display together so as to contain the liquid crystalline material therebetween and provide a hermetic seal about the liquid crystalline material, none have heretofore provided a good barrier against vapor penetration into the cavity in conjunction with having good mechanical durability in combination with being made from low cost materials that are easily handled and applied.

Such seals are typically deposited as a fluid coating about the peripheral edges of at least one but more commonly about both of the plates with the plates then pressed together to provide a cavity within the coated edges between the plates for containing the liquid crystalline material. The thickness of the cavity between the plates is typically in the order of several microns to about 100 microns in thickness and the uniformity of the thickness of the cavity between the facing surfaces of the plates is typically controlled by the use of spacers having a controlled thickness between the plates or in some instances by incorporating spacing material such as glass beads randomly in the sealant material or in a controlled manner such as disclosed in U.S. Pat. No. 3,919,452. Commonly at least one opening is provided through the seal for introducing the liquid crystalline material into the cavity either before the plates are pressed together or afterwards for example by drilling or pressing an object of suitable thickness and length through the seal to provide the opening. More commonly, at least two openings are provided through the seal in the manner described above and positioned so as to enable the liquid crystalline material to be introduced into the cavity without air entrapment or creating of a vacuum. After the cavity is filled with the liquid crystalline material, the openings are sealed with a material that preferably will bond to the sealant material and, like the sealant material, will not contaminate and will be chemically inert with respect to the liquid crystalline material. In some instances such openings may not be required where, prior to curing, the plates are first pressed together with the sealant material in place therebetween and then are able to be sufficiently separated along a portion of at least one edge to provide an opening through which the liquid crystalline material can be poured and afterwhich the plates are able to be again pressed together and the assembly cured under heat. Since the facing inner surface of the plates of a liquid crystal display are coated with a transparent electrically conductive material such as tin oxide or indium oxide that is typically etched into a plurality of discrete image segments with individual conductive leads reaching to the edge of one of the plates, accommodations are normally made such that the seal does not interfere with electrical power connections to the leads. In addition, it is common practice to deposit an organic surfactant material such as polyvinyl alcohol over the conductive coating that can be rubbed to provide sufficient homogeneous (parallel) alignment of a nematic liquid crystal having positive dielectric anistrophy. Likewise, means, such as a highly conductive plug of low electrical resistance such as silver, is often provided through the seal to transmit electrical power to the conductive coating in the inner surface of the plate not having the power leads so as to transfer electrical power to the plate when electrical power is applied to the plate having the power leads. Although not hereinafter referred to or shown in the drawings, it is to be understood that the seal of the display of the present invention may be adapted to provide access to such power leads and such transfer of power to the plate opposite the plate having the power leads in any suitable manner. Depending upon the materials from which the liquid crystal display seal is made, the seal may or may not be cured under heat for a prescribed period of time after the liquid crystalline material has been introduced into the cavity by pouring or through the openings previously described.

An example of a liquid crystal display seal made from tetrafluoroethylene-ethylene-copolymer or a chlorotrifluroethylene-ethylene copolymer is disclosed in U.S. Pat. No. 3,871,746. U.S. Pat. No. 3,990,781 discloses a liquid crystal display seal made from a dispersion of flurocarbon and an organosilane coupling agent. Although such seals may be used to advantage, their use is generally limited for they require the use of costly flurocarbonated materials and generally involve the time consuming task of having to provide the previously described openings through which the liquid crystalline material is to be introduced as well as requiring a curing temperature in excess of 240° C. that would preclude using the rubbed polymeric coatings previously described and require coatings such as are provided by the expensive process of sputtering a silicone-oxide coating or the like onto the conductive coating.

U.S. Pat. No. 3,926,502 discloses a liquid crystal display seal made from a low melting point glass. Although such seals may provide a satisfactory hermetic seal, they require expensive application equipment and difficult handling procedures as well as requiring the previously described openings through the seal through which the liquid crystalline material is introduced and are unable to permit the pouring technique previously described. Further, such glass seals are generally known to be brittle and possess poor resistance to vibration as well as precluding the use of organic surfactant coatings on the facing surfaces of the display plates due to the high temperature required in the process of applying such glass seals.

U.S. Pat No. 3,994,568 discloses a liquid crystal light shutter display gasket made from a thermoplastic phenoxy resin that may contain high molecular weight epoxy resins that may have their widely separated epoxy rings reacted to form a "slightly" thermosetting adhesive sealer which will behave in a similar manner to the all thermoplastic phenoxy. It has been found however that such phenoxy when either uncrosslinked or crosslinked only to the extent that it still behaves as a thermoplastic material is unable to provide a good barrier against the penetration of water vapor into the cavity containing the liquid crystalline material. Water vapor penetration into the cavity is undesirable in that it has been found to produce spurious electrical paths within the cavity and cause a diffusion of the image produced and thereby cause what is known as "blooming" in the trade.

Examples of cyanoacrylate and polybutadiene materials that have been used as a sealant for the previously described openings through the seal of a liquid crystal display are disclosed in U.S. Pat. No. 4,007,077. Although such materials may be suitable for the purpose described, they are generally unable to provide the ability to hermetically seal in conjunction with having high resistance to vapor penetration and good mechanical durability.

SUMMARY OF THE INVENTION

Accordingly, it is an object of this invention to provide a liquid crystal display utilizing an electrically insulative sealant material to hermetically seal the liquid crystalline material of the display between a pair of plates that is relatively easy to prepare and apply and is able to chemically bond the plates together.

It is another object of this invention to provide a liquid crystal display that utilizes an electrically insulative hermetic sealant material to seal the liquid crystalline material between a pair of plates of the display that is chemically inert with respect to the liquid crystalline material and other components on the faces of the plates with which the sealant comes into contact.

It is yet another object of this invention to provide a liquid crystal display that utilizes an electrically insulative hermetic sealant material that is made from low cost components and exhibits good mechanical durability.

It is still another object of this invention to provide a liquid crystal display that utilizes an electrically insulative hermetic sealant material that is able to be crosslinked at a temperature low enough so as to permit, the use of standard transparent polymeric rubbing coatings upon the faces of the plates with which the liquid crystalline material comes into contact.

It is yet another object of this invention to provide a liquid crystal display that utilizes an electrically insulative hermetic sealant material to seal the liquid crystalline material within a cavity between a pair of spaced-apart plates that permits the liquid crystalline material to be inserted into the cavity either by one or more openings through the seal or by pouring through an opening provided by separating the plates prior to curing the sealant material.

It is a further object of this invention to provide a liquid crystal display that utilizes a durable, electrically insulative, thermoset sealant to hermetically seal the liquid crystalline material between a pair of plates of the display that is sufficiently crosslinked by a crosslinking agent to provide the seal with improved resistance to vapor penetration into the cavity between the plates in which the liquid crystalline material is contained.

DETAILED DESCRIPTION OF THE PREFERRED EMBODIMENTS

Figure 1:
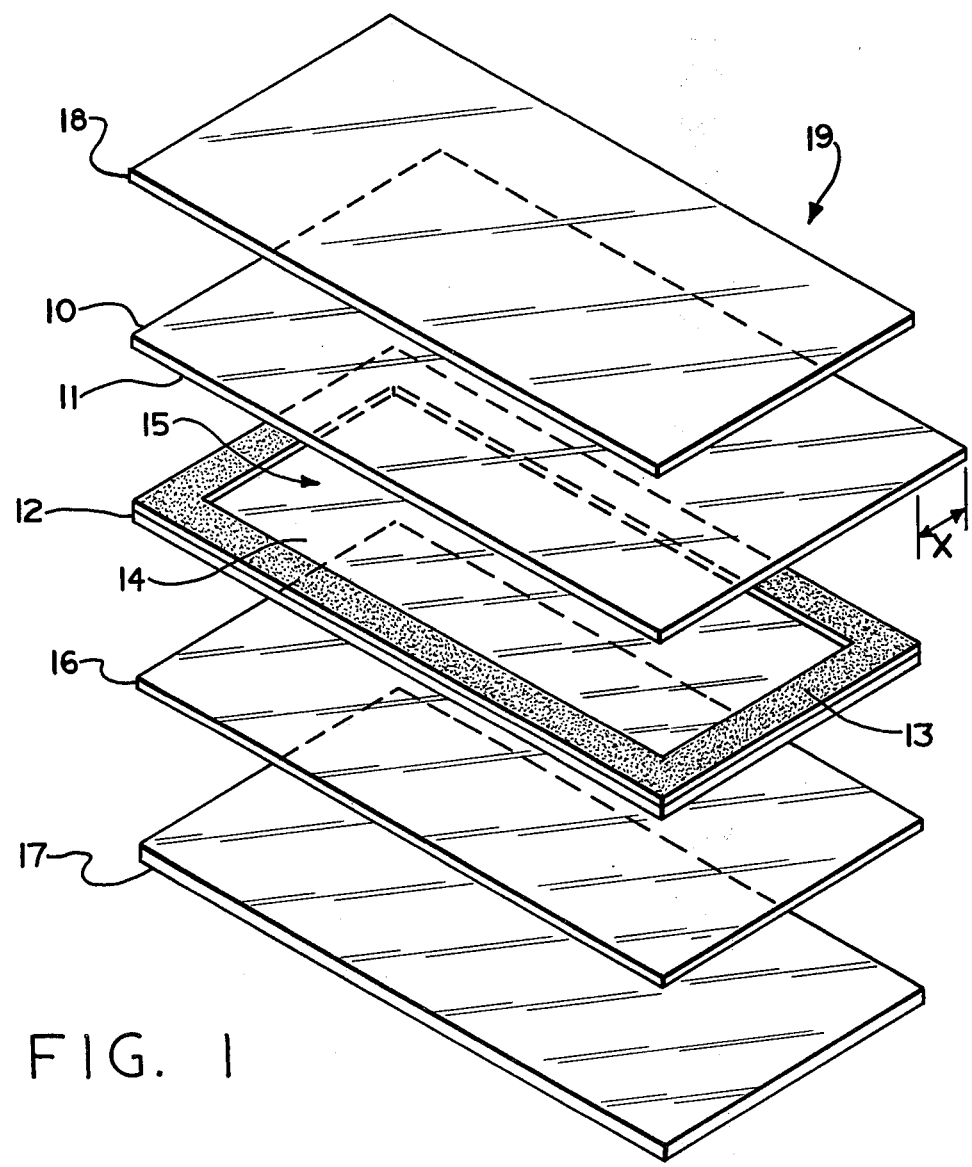
FIG. 1 shows an exploded perspective view of a typical liquid crystal display of the invention.

FIG. 1 shows a typical embodiment of liquid crystal display 19 of the invention with its component parts separated prior to their assembly. Display 19 has substantially flat plate 10 that has a transparent electrically conductive coating 11 on its inner surface (not shown). Plate 12 is also substantially flat and has a transparent electrically conductive coating 14 on its inner surface facing conductive coating 11 on plate 10. Seal 13 is adapted to bond plate 10 to plate 12 when they are pressed together and provide a cavity 15 therebetween for containing the liquid crystalline material to be incorporated into the display. Plate 10 is made from a transparent glass. Plate 12 is likewise made from a glass and may or may not be transparent dependent on whether a non-transparent reflective plate 17 is incorporated into display 19 adjacent plate 12. Display 19 may also include either one or both polarizer plates 16 and 18 dependent on the particular design of display 19 involved. In the embodiment of display 19 shown in FIG. 1, plate 10 is wider in width than plate 12 by a distance "X" so as to enable the hereinbefore described power leads of conductive coating 11 on the inner surface of plate 10 to extend beyond seal 13 for connecting display 19 to a source of electrical power. For purposes of simplicity, the hereinbefore described openings through seal 13 for introducing the liquid crystalline material into cavity 15 and the means for transmitting electrical power from conductive coating 11 to conductive coating 14 are not shown. Although the embodiment of the display of FIG. 1 has five plates, it is to be understood that liquid crystal displays having any number of plates or film coatings in addition to the pair of plates between which the liquid crystalline material is contained and hermetically sealed are considered within the scope of the invention such as example where display 19 does not have a reflector 17 or where display 19 has only one polarizer plate 18 or where display 19 has neither polarizer plates 16 and 18 nor reflector plate 17.

Seal 13 is made from a composition comprising a blend of at least one phenoxy resin and at least one epoxy resin in conjunction with a suitable crosslinking agent. Perferably the composition from which seal 13 is made includes at least one suitably selected phenoxy resin such as disclosed in U.S. Pat. No. 3,994,568 and sold under Grade Type PKHJ by Union Carbide Corporation having the formula:

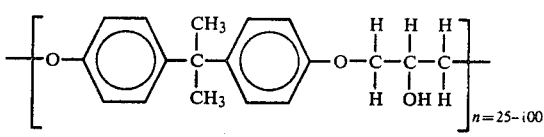

Although other epoxy resins may be suitable, the epoxy resins used in the composition of seal 13 in conjunction with the previously described phenoxy resins are preferably of the type sold by Shell Chemical Company under the trademark "EPON" having the general formula:

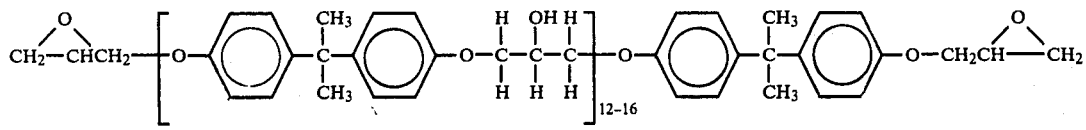

Although any non-contaminating method may be used that will suitably convert the composition of seal 13 from an uncrosslinked material to a crosslinked thermoset material, ethyl methyl imidizole has been found to be of particular advantage as a non-contaminating free radical producing catalyst and is preferred for use as a heat activatable crosslinking agent for opening up a sufficient number of the epoxide rings and displacing a sufficient number of the hydrogen atoms on the hydroxyl sites present in the composition to chemically bond the plates together and provide seal 13 with improved resistance to vapor penetration.

It is preferred that the composition from which seal 13 is made be adapted to cause it to be sufficiently fluid prior to being fully converted to a thermoset material in order that it can be easily applied such as by silk screening around the periphery of plate 12 of display 19 and more preferably around the periphery of the facing surfaces of both plates 10 and 12. Although any solvent may be used that will suitably solvate the phenoxy and epoxy resins and not interfere with the crosslinking activity, it is preferred to add an amount of solvent such as diethylene carbitol to solvate the phenoxy-epoxy resin combination of seal 13 sufficiently to cause the composition to become fluid. Solvation of the seal 13 composition by solvents may not be required where, for example, the composition is able to be heated to a fluid state at a temperature less than the temperature at which the heat activatable cross-linking agent is activated or where one or more of the epoxy resins is a fluid at ambient temperature of about 25° C. and even a lesser amount of heat is required to fluidize the entire composition without activating the heat activatable crosslinking agent.

In compositions of seal 13 that include a solvent, the solvent is permitted to evaporate after the composition has been disposed as seal 13 around the periphery of plate 10 or both plates 10 and 12 and before plates 10 and 12 are pressed together. In cases where the composition of seal 13 uses a heat activatable crosslinking agent, the pressed together assembly of plates 10 and 12 and seal 13 are preferably cured at a temperature and for a period of time sufficient to activate and effect the cure of seal 13 afterwhich plates such as polarizer plates 16 and/or 18 and reflector plate 17 may be added where such are desired for a particular design.

It has been found to be of particular advantage to use two epoxy resins of different epoxide equivalent weights in the composition of seal 13. More particularly it has been found that a mixture of two epoxy resins having respective epoxy equivalent weights of from 450 to 550 and from 2500° to 4000°, such as sold respectively by Shell Chemical Company under the trade number "EPON" 1001F and "EPON" 1009, provide a composition that is readily curable and provides seal 13 with high resistance to vapor penetration.

In addition, the composition of seal 13 may contain suitable fillers such as silicone oxide or fused aluminum oxide sold under the trade number TC 445 by Freeport Chemical Company and may contain randomly dispersed spacers of controlled thickness such as glass beads where such are desired to aid in establishing and maintaining a fixed distance between plates 10 and 12.

A preferred combination of component materials for use in making seal 13 and their preferred amounts and ranges are shown in following Table I.

TABLE I

| COMPONENT | PREFERRED (% by Weight) | RANGE (% by Weight) |
| --- | --- | --- |
| di-ethylene carbitol | 51 | 5-70 |
| Union Carbide PKHJ | 23 | 2-50 |
| Epon 1001 F | 16 | 5-70 |
| Epon 1009 | 2.7 | 0-10 |
| filler (TC 445) | 5.6 | 0-10 |
| ethyl-methyl imidizole | 1.7 | sufficient to convert to a crosslinked thermoset |

An example of the method of preparation of a preferred seal 13 composition is described as follows:

(a) Stir until clear at a temperature less than the boiling point temperature of di-ethylene carbitol a mixture of:

20925 gm di-ethylene carbitol
1417.5 gm Union Carbide PKHJ
157.5 gm Epon 1009

(b) Cool and add:

1012.5 gms Epon 1001 F (c) To 800 gm of the mixture of (a) and (b) above, add and blend at a temperature less than about 50°-60° C.:

62.5 gm. TC 445
12.5 gm. ethyl methyl imidizole dissolved in a blend of 60% di-ethylene carbitol and 40% isopropyl alcohol.

The above composition has been found to be chemically stable and capable of storage for several months prior to use. It has also been found that the above composition can be easily applied by standard silk screening techniques and converted to a thermoset by curing at a temperature of from 105° C. to 120° C. for about fifteen minutes which temperature is low enough to prevent degradation of the liquid crystalline material by heat. In addition, the above composition provides a seal 13 that is mechanically durable and permits plates 10 and 12 to be separated after pressing them together prior to curing so that the liquid crystalline material can be simply poured into cavity 15 without having to introduce the liquid material through one or more openings through seal 13 as previously described.

Liquid crystal displays 19 having their liquid crystalline materials hermetically sealed with the electrically insulative thermoset compositions of seal 13 hereinbefore described have been found to provide a superior barrier to the penetration of water vapor into the cavity containing the liquid crystalline material. As an example of the superiority of seal 13 of the invention, a comparative study at 60° C. and 95% relative humidity was undertaken between identical liquid crystal displays utilizing the thermoplastic phenoxy seal disclosed in U.S. Pat. No. 3,994,568 and the seal made from a composition having the preferred component amounts of Table I. The result was that total blooming occurred within 250 hours in the display utilizing the thermoplastic phenoxy seal whereas after 600 hours there was no evidence of blooming in the liquid crystal displays of the invention that were hermetically sealed with the phenoxy-epoxy composition of Table I which was sufficiently crosslinked by a crosslinking agent such as free radical producing ethyl methyl imidizole to provide the seal with improved resistance to water vapor penetration.

What is claimed is:

1. A hermetically sealed liquid crystal display comprising a liquid crystal layer enclosed between a pair of parallel plates of which at least one plate is transparent, said plates chemically bonded together by means of an electrically insulative sealant material disposed between the plates and surrounding the liquid crystal layer, said display having improved resistance to vapor penetration provided by said sealant material being a crosslinked thermoset product of an initially uncrosslinked composition comprising a mixture of at least one phenoxy resin and at least one epoxy resin in conjunction with a crosslinking agent, said composition adapted to be sufficiently flowable before crosslinking to enable the composition to be disposed as said sealant material between said plates, and said composition containing an amount of said crosslinking agent sufficient to insure that said composition is sufficiently crosslinked to provide said sealant material with improved resistance to vapor penetration after said composition has been disposed as said sealant material between the plates.

2. The liquid crystal display of claim 1 wherein the composition contains two epoxy resins having different epoxide equivalent weights.

3. The liquid crystal display of claim 2 having an epoxy resin that has an epoxide equivalent weight of from 2500 to 4000 and another epoxy resin having an equivalent weight of from 450 to 550.

4. The liquid crystal display of claim 2 wherein at least one of the epoxy resins is a liquid at ambient temperature.

5. The liquid crystal display of claim 1 or 2 wherein the composition is adapted to be flowable by means of a solvent included in the composition that is capable of solvating the phenoxy resin and the epoxy resin without interferring with the crosslinking of said composition to said thermoset sealant material.

6. The liquid crystal display of claim 5 wherein the composition includes a filler.

7. The liquid crystal display of claim 6 wherein the filler is silicone oxide.

8. The liquid crystal display of claim 6 wherein the filler is fused aluminum oxide.

9. The liquid crystal display of claim 5 wherein the solvent is di-ethylene carbitol.

10. The liquid crystal display of claim 1 having only one phenoxy resin having the formula:

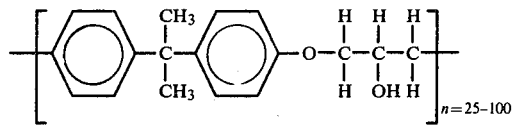

11. The liquid crystal display of claim 1 wherein having only one epoxy resin having the general formula:

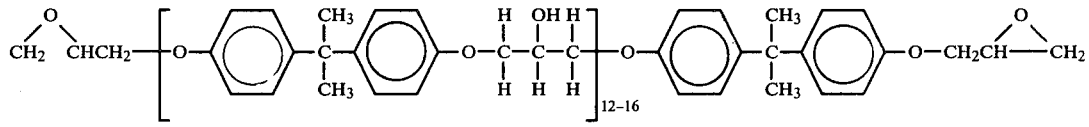

12. The liquid crystal display of claim 1 wherein the crosslinking agent is a heat activatable free radical producing catalyst.

13. The liquid crystal display of claim 12 wherein the catalyst is ethyl methyl imidizole.

* * * * *